(12) United States Patent
Irofti et al.

(10) Patent No.: US 12,056,507 B2
(45) Date of Patent: Aug. 6, 2024

(54) METHOD FOR VALIDATING A DATA FLOW SYSTEM

(71) Applicant: COMMISSARIAT A L'ENERGIE ATOMIQUE ET AUX ENERGIES ALTERNATIVES, Paris (FR)

(72) Inventors: Dina Irofti, Orsay (FR); Paul Dubrulle, Paris (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 182 days.

(21) Appl. No.: 17/434,242

(22) PCT Filed: Feb. 26, 2020

(86) PCT No.: PCT/FR2020/050377
§ 371 (c)(1),
(2) Date: Aug. 26, 2021

(87) PCT Pub. No.: WO2020/174186
PCT Pub. Date: Sep. 3, 2020

(65) Prior Publication Data
US 2022/0147372 A1 May 12, 2022

(30) Foreign Application Priority Data
Feb. 27, 2019 (FR) ...................... 19 02028

(51) Int. Cl.
*G06F 9/44* (2018.01)
*G06F 8/41* (2018.01)
(Continued)

(52) U.S. Cl.
CPC ............ *G06F 9/4494* (2018.02); *G06F 8/433* (2013.01); *G06F 9/54* (2013.01); *G06F 16/9024* (2019.01)

(58) Field of Classification Search
None
See application file for complete search history.

(56) References Cited

U.S. PATENT DOCUMENTS

| 2013/0339923 A1* | 12/2013 | Xu ......................... G06F 8/433 717/104 |
| 2014/0040855 A1* | 2/2014 | Wang .................... G06F 30/327 717/107 |

(Continued)

FOREIGN PATENT DOCUMENTS

| FR | 3 026 205 A1 | 3/2016 |
| JP | 4-62671 A | 2/1992 |

(Continued)

OTHER PUBLICATIONS

Lee, et al., Synchronous Data flow, 1987, IEEE, proceedings of the IEEE vol. 75, No. 9., pp. 1235-1245 (Year: 1987).*

(Continued)

*Primary Examiner* — Eric Coleman
(74) *Attorney, Agent, or Firm* — Oblon, McClelland, Maier & Neustadt, L.L.P.

(57) ABSTRACT

The present invention relates to a method and device for validating a data flow system represented by a data flow graph, comprising: —an acquisition module (9) configured to acquire data related to first and second common parts of the data flow graph, and—a supervision module (11) configured to incrementally verify the coherence of the data flow system by verifying the local coherence of a common unidirectional connection connecting the first common part of the data flow graph to the second common part of the data flow graph at each increment.

11 Claims, 5 Drawing Sheets

(51) Int. Cl.
 *G06F 9/448* (2018.01)
 *G06F 9/54* (2006.01)
 *G06F 16/901* (2019.01)

(56) References Cited

U.S. PATENT DOCUMENTS

| | | | |
|---|---|---|---|
| 2014/0237459 | A1 | 8/2014 | Von Platen et al. |
| 2015/0372877 | A1* | 12/2015 | Tompkins ............... H04L 47/20 715/736 |
| 2016/0217029 | A1 | 7/2016 | Yoon et al. |
| 2017/0286342 | A1 | 10/2017 | Derler et al. |
| 2017/0308489 | A1 | 10/2017 | Dubrulle et al. |

FOREIGN PATENT DOCUMENTS

| | | |
|---|---|---|
| JP | 6-348482 A | 12/1994 |
| JP | 11-3367 A | 1/1999 |
| JP | 2006-522406 A | 9/2006 |

OTHER PUBLICATIONS

Moreira, O. et al., Scheduling Real-Time Streaming Applications onto an Embedded Multiprocessor, 2014, Springer. Chapter 3, pp. 38-52. (Year: 2014).*

Klohs, Karsten, Validation of Data Flow Results for Program Modules, 2009, Doctoral dissertation, Paderborn University, 299 pages (Year: 2009).*

Hsu, Chia-Jsu, A Mixed-Mode Vector-Based Dataflow Approach for Modeling and Stimulating LTE Physical Layer, 2010, ACM, pp. 18-23. (Year: 2010).*

Beblis, V. et al., BPDS: A Statically Analyzable DataFlow Model with Integer Boolean Parameters, 2013, IEEE. 10 pages. (Year: 2013).*

Bhattacharya , B., et al., Parameterized Dataflow Modeling for DSP Systems. 2001, IEEE, IEEE Transactions on Signal Processing, vol. 49, No. 10 pp. 2408-2421. (Year: 2001).*

Gielen , M. , Synchronous Dataflow Scenarios, 2010, ACM, ACM transactions on Embedded Computing Systems, vol. 10, No. 2, pp. 16:1-16:31. (Year: 2010).*

International Search Report issued on May 12, 2020 in PCT/FR2020/050377 filed on Feb. 26, 2020, 2 pages.

French Preliminary Search Report issued on Oct. 8, 2019 in French Patent Application No. 19 02028 filed on Feb. 27, 2019 (with translation of category of cited documents), 2 pages.

Lee et al., "Synchronous Data Flow", Proceedings of the IEEE, Sep. 1987, vol. 75, No. 9, pp. 1235-1245, XP000048475.

Lee et al., "Static Scheduling of Synchronous Data Flow Programs for Digital Signal Processing", IEEE Transactions on Computers, Jan. 1987, vol. C-36, No. 1, pp. 24-35.

U.S. Appl. No. 17/271,964, Feb. 26, 2021, Paul Dubrulle et al.
U.S. Appl. No. 17/415,477, Jun. 17, 2021, Paul Dubrulle.

* cited by examiner

METHOD FOR VALIDATING A DATA FLOW SYSTEM

The present invention relates to a method and a device for validating a data flow system, and more particularly the verification of the consistency of the system.

PRIOR ART

The present invention applies to systems in which concrete applications use predefined interface functions to exchange data among them. In particular, the invention applies to all the data flow systems (or applications) of the synchronous type including components (or tasks) called actors, connected to each other by unidirectional communication channels (or connections). These systems are often used to describe the behaviour of signal-processing applications, since they provide execution semantics suitable for analysing their performance. The most common criteria for the analysis of performance are directly related to the optimisation of the dimensioning of the buffer memory, of the bitrate or of the latency. A first step in the resolution of these problems of optimisation involves verifying several properties, such as the existence of an upper limit for the buffer memory sizes and the absence of blocking. These properties are advantageously decidable in a data flow system by verifying properties of consistency and of absence of deadlock described below.

A data flow system is in general modelled by a data flow graph. The data flow graph describes a data flow structure in which the actors are represented by nodes (or vertices) and the communication channels by arcs. Each actor of the data flow graph has available a set of ports. Each port represents an endpoint of the communication channel. The actors generally have a cyclical behaviour, called activation or firing, involving reading input data from their input ports, executing their tasks and placing output data on their output ports. A firing can only take place when the actor has available sufficient information on its input ports. The quantity of data sent on the output ports or received from the input ports is specified by a number of tokens. The production (and respectively consumption) rates represent the number of tokens that an actor can send (and respectively receive) when it fires. It is noted that in a data flow of the synchronous type, the consumption and production rates are constant.

A data flow system can be planned statically, since each actor of the data flow graph produces and uses the same quantity of data every time that it fires. Moreover, a periodic program can be constructed for a synchronous data flow system, given that all the consumption and production rates are fixed. In a valid periodic schedule, each actor activates (i.e. fires) a certain number of times before the graph goes back to its initial state, with the same number of tokens initially on the channels.

In general, a valid repetition vector is constructed during the planning of an SDF data flow system. The repetition vector is a vector, the components of which are positive whole numbers, and the dimension of which is equal to the number of actors belonging to the data stream graph. Each component of the vector corresponds to an actor and specifies the number of firings triggered by the actor during the periodic program. More than one repetition vector can be found for a given graph. The minimum repetition vector has the minimum norm and corresponds to a minimum periodic schedule. It is noted that the repetition vector is used to verify the validity of the data flow system.

Indeed, to find a valid periodic planning of a data flow system, the data flow graph modelling the system must verify properties of consistency and of absence of deadlock. The property of consistency relates to the fact that during the period of execution, the tokens in a data flow graph do not accumulate on the unidirectional channels. It is known [2] that the existence of a non-zero repetition vector is a necessary condition for the consistency of a data flow graph, that is to say that it has a valid periodic schedule. Moreover, the property of absence of deadlock (also called liveness) means that the actors have enough tokens on their inputs to continue firing. It is noted that the properties of consistency and of absence of deadlock are independent.

Figure 1A:
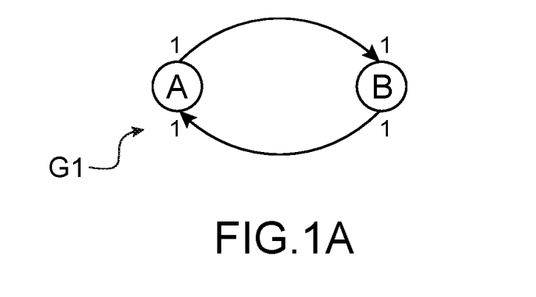
FIG. 1A, FIG. 1B, and FIG. 1C illustrate examples of data flow graphs with two actors showing the properties of consistency and of absence of deadlock, according to the prior art.
Figure 1B:
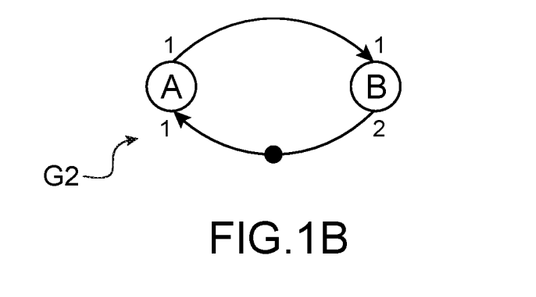
Figure 1C:
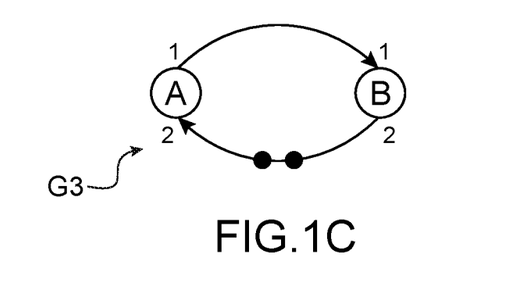

FIGS. 1A-1C illustrate examples of data flow graphs with two actors showing the properties of consistency and of absence of deadlock, according to the prior art.

The example of FIG. 1A illustrates a graph that is consistent but has deadlock. Indeed, this graph G1 is consistent since no token accumulates on the channels. The actor A produces a token, which is consumed by the actor B, then, the actor B fires and produces a token, which is consumed by the actor A, and so on. The repetition vector corresponding to the graph G1 is X1=(1 1), which means that each of the actors A and B activates (fires) once before the graph G1 goes back to its initial state. However, this graph G1 is not free of deadlock since there is no initial token on the channels, which means that neither the actor A nor the actor B can start firing.

The example of FIG. 1B illustrates a graph G2 that is non consistent but has an absence of deadlock. The unidirectional channel going from B to A contains an initial token. The actor A consumes this initial token and produces another token, which is in turn consumed by the actor B. Then, the actor B produces two tokens per firing, so that the actor A has enough tokens on its inputs to continue firing. However, the tokens continue to accumulate on the input ports of the actor A since the rhythm of consumption by the latter is not as fast as that of production by the actor B. In this case, no repetition vector can be found for this graph G2, which means that it is not consistent.

In contrast, the example of FIG. 1C illustrates a graph G3 satisfying both the property of consistency and of liveness (i.e. absence of deadlock). Indeed, the actor A consumes the two initial tokens on its input port and produces a token on the output port. Then, the actor B consumes a token and produces two tokens on its output port, which means that the graph G3 goes back to its initial state. The repetition vector corresponding to the graph G3 is thus X3=(1 1). The existence of such a (non-zero) repetition vector means that the graph G3 is consistent. Moreover, a way to verify the absence of deadlock, as proposed in [12], involves triggering each node the number of times specified by the repetition vector. If the data flow graph does not have deadlock during this test, then it is free of any deadlock.

The property of consistency is important because if a repetition vector cannot be found for a given data flow graph, then any data flow system corresponding to this graph will either be deadlocked, or in buffer memory sizes without an upper limit.

At present, the formalism generally used in the prior art for the verification of the consistency is based on the extraction of a matrix called "topology matrix" of the data stream graph. This formalism is described by Lee and Messerschmitt [1, 2] for the synchronous data flow graphs. The topology matrix describes the manner in which the graph is connected and the quantity of information that each actor in the graph can send or receive at each firing. The topology matrix is generally designated by the letter gamma Γ. Each actor of the data flow graph has a column in the topology matrix Γ and each channel (connection) is assigned to a line. Thus, the (i, j)$^{th}$ input of the topology matrix Γ corresponds to the rate of production or of consumption of the node j on the channel i. By convention, the production rates are designated by positive numbers while the consumption rates are designated by negative numbers.

According to the above definition, the topology matrices Γ1, Γ2 and Γ3 corresponding to the graphs G1, G2 and G3 illustrated in FIGS. 1A-1C are:

$$\Gamma 1 = \begin{pmatrix} 1 & -1 \\ -1 & 1 \end{pmatrix}, \Gamma 2 = \begin{pmatrix} 1 & -1 \\ -1 & 2 \end{pmatrix}, \text{ and } \Gamma 3 = \begin{pmatrix} 1 & -1 \\ -2 & 2 \end{pmatrix} \quad (1)$$

A non-zero repetition vector, noted as X here, can optionally be found by solving the following matrix equation:

$$\Gamma \vec{X} = \vec{0} \quad (2)$$

The existence of a non-zero repetition vector X is a necessary condition for the existence of a periodic schedule in which the buffer memory sizes remain limited. The resolution of the matrix equation for the graphs G1, G2 and G3 gives the vectors indicates above: X1=(1 1), X2=(0 0) and X3=(1 1).

Thus, to be able to verify whether there is a non-zero repetition vector X, it is first necessary to entirely construct the data flow graph. In other words, the data flow system must be in its final form before being able to verify whether the system is consistent or not.

This method is very costly in terms of time and calculation and in the case in which the data flow system has been judged to be inconsistent, the method does not allow to detect the elements responsible for this inconsistency. Moreover, if a new task or actor is added to a data flow system that is already consistent, the entire data flow system thus modified must be once again reconsidered before deciding whether the latter remains consistent.

The object of the present invention is, consequently, to propose a method for validating a data flow system of the synchronous type that overcomes the aforementioned disadvantages, in particular, by allowing a fast and simple verification of the consistency in the case in which new tasks are added as well as by allowing the identification of the inconsistent elements.

DISCLOSURE OF THE INVENTION

The present invention relates to a method for validating a data flow system represented by a data flow graph including actors having determined production rates and consumption rates, said method being characterised by an incremental verification in which the consistency of a current unidirectional connection connecting a first current part of the data flow graph to a second current part of the data flow graph is locally verified at each increment.

This method allows the data flow graph to have a flexible topology in which actors (or connections) can be deleted, added or modified.

Advantageously, the method includes the following steps:
defining origin and destination actors connected by said current unidirectional connection, the origin and destination actors belonging to said first and second current parts of the data flow graph, respectively, the origin and destination actors being defined by origin $x_i$ and destination $x_j$ components, respectively, that can belong to a single current repetition vector or to two current repetition vectors representative of said first and second current parts of the data flow graph,
assigning to said current unidirectional connection a production rate $r_i$ relative to the origin actor and a consumption rate $r_j$ relative to the destination actor,
verifying an indicator of local consistency of said current unidirectional connection, said indicator of local consistency examining whether the product of said production rate $r_i$ times said origin component $x_i$ is equal to the product of said consumption rate $r_j$ times said destination component $x_j$,
defining a resulting current repetition vector representative of said first and second current parts of the data flow graph.

Thus, the consistency can be verified locally during the construction of the data flow graph or during the addition of a new connection without reconsidering the entire data flow graph. Indeed, the consistency of the new connection can be evaluated by taking into account the state of the previous graph.

Advantageously, in the case in which said current unidirectional connection verifies the indicator of local consistency, said method includes the following steps:
if the origin and destination actors are associated with two distinct current repetition vectors, called origin and destination repetition vectors, then the resulting current repetition vector is constructed by concatenating said origin and destination repetition vectors, and
if the origin and destination actors are associated with a single current repetition vector, then the resulting current repetition vector is equal to said single current repetition vector.

Thus, every time that a new connection is added, it can be directly known whether this new connection is consistent or not.

Advantageously, in the case in which said current unidirectional connection does not verify the indicator of local consistency said method includes the following steps:
if the origin and destination actors are associated with two distinct current repetition vectors, called origin and destination repetition vectors, then two natural numbers are calculated, called production coefficient $c_i$ and consumption coefficient $c_j$, verifying an equality between on the one hand the product of said production coefficient $c_i$ times said production rate $r_i$ times said origin component $x_i$ and on the other hand the product of said consumption coefficient $c_j$ times said consumption rate $r_j$ times said destination component $x_j$, and the resulting current repetition vector is constructed by concatenating the origin repetition vector after having multiplied it by the production coefficient $c_i$ with the destination repetition vector after having multiplied it by the consumption coefficient $c_j$, and
if the origin and destination actors are associated with a single current repetition vector, then the current unidirectional connection is identified as being inconsistent.

Thus, this method allows to identify which element of the data flow system is inconsistent.

Advantageously, the production $c_i$ and consumption $c_j$ coefficients are given by the following equations:

$$c_i = \frac{m}{d} \frac{x_j}{r_i} \bigg/ pgcd\left(\frac{m}{d} \frac{x_j}{r_i}, \frac{m}{d} \frac{x_i}{r_j}\right) \text{ and}$$

-continued $$c_j = \frac{m}{d}\frac{x_i}{r_j} \Big/ pgcd\left(\frac{m}{d}\frac{x_j}{r_i}, \frac{m}{d}\frac{x_i}{r_j}\right)$$

where m=ppcm($r_i$,$r_j$) and d=pgcd($x_i$,$x_j$).

Advantageously, the method includes an operation of addition of a new unidirectional connection between first and second current parts of the data flow graph.

Thus, the method can be effectively used for modular data flow systems.

Advantageously, the method includes an operation of deletion of a unidirectional connection from the data flow graph represented by a single repetition vector, called initial repetition vector, according to the following steps:
  if the data flow graph is divided into first and second data flow subgraphs after the deletion of said unidirectional connection, then a first repetition vector is constructed by grouping together the components of said initial repetition vector relative to said first data flow subgraph, and a second repetition vector is constructed by grouping together the components of the initial repetition vector relative to said second data flow subgraph, and
  if the graph remains connected after the deletion of said unidirectional connection, then said initial repetition vector is not modified.

Advantageously, the method includes an operation of modification of a unidirectional connection, according to the following steps:
  assigning new production $r'_i$ and consumption $r'_j$ rates relative to the origin and destination actors connected by said unidirectional connection,
  applying the operation of deletion of a unidirectional connection, and
  applying the operation of addition of a unidirectional connection.

Advantageously, the method includes the verification of the consistency of the data flow graph during its construction by assigning to each additional destination actor an additional repetition vector, the only component $x_i$ of which is equal to 1, said additional destination actor being connected by said current unidirectional connection to an origin actor belonging to said current data flow graph being constructed.

The present invention is also aimed at a system for processing a digital signal designed by using the validation method according to any one of the previous features, said processing system being modelled by a data flow system including actors connected to each other by unidirectional communication connections, each actor being configured to receive input data and to deliver output data.

Advantageously, said system is a system out of any one of the following processing systems: medical imaging system, computer vision system, video encoding and compression system, system for converting an audio sampling frequency, system for designing tools for wireless communication systems, multichannel speech enhancement system, onboard system.

The present invention is also aimed at a device for validating a data flow system represented by a data flow graph including actors having determined production rates and consumption rates, said system including:
  an acquisition module configured to acquire data relating to first and second current parts of the data flow graph, and
  a supervision module configured to incrementally verify the consistency of said data flow system by verifying at each increment the local consistency of a current unidirectional connection connecting the first current part of the data flow graph to the second current part of the data flow graph.

BRIEF DESCRIPTION OF THE DRAWINGS

Other particularities and advantages of the device and of the method according to the invention will be clearer upon reading the description given below, for informational and non-limiting purposes, in reference to the appended drawings in which.

DETAILED DESCRIPTION OF THE INVENTION

The principle of the present invention is to verify the consistency of a data flow system incrementally and locally. The present invention is interested in particular in data flow systems in which the actors have determined (i.e. defined or quantifiable) consumption and production rates. For example, the system can be a synchronous data flow system of the SDF type (Synchronous dataflow) or a synchronous and cyclical data flow system.

Figure 2:
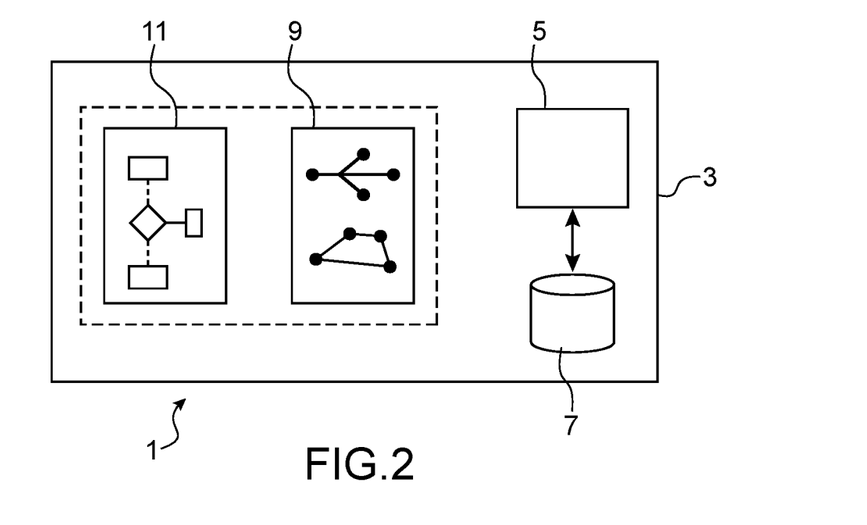
FIG. 2 schematically illustrates a device and a method for validating a data flow system, according to an embodiment of the invention.

FIG. 2 schematically illustrates a device and a method for validating a data flow system, according to an embodiment of the invention.

The validation device 1 is implemented by hardware means including a machine for processing the information like a calculator or computer 3 including a microprocessor 5 and memories 7. The microprocessor 5 is configured to execute one or more computer programs comprising program code instructions, stored in the memories 7 of the computer and designed to implement the validation of a data flow system.

According to the invention, the validation device 1 includes an acquisition module 9 and a supervision module 11.

The acquisition module 9 is configured to acquire data relating to a current data flow graph and more particularly data relating to first and second current parts of the data flow graph as well as a current connection between these two parts. First or second current part of a data flow graph means a part of the graph including at least a single actor.

In general, a data flow graph includes independent actors exchanging quantifiable information among them, through unidirectional communication connections (i.e. channels). The actors can be software (for example applications) and/or hardware (for example, sensors, cameras, probes, microprocessors, etc.) entities. The actors are represented by nodes (or vertices) and the communication connections by arcs. Each actor is configured to wait to receive a specified quantity of data on its input ports with the goal of consuming this quantity of data, of carrying out (or not) a processing of this data and of producing a specified quantity of data on its output ports intended for new actors, and each repeating this behaviour indefinitely. The cyclical process of consumption/processing/emission is routinely called an activation or a firing.

In synchronous data flows, all the actors have determined (quantifiable) consumption and production rates, and these rates are known during the construction of the data flow graph. The nodes of the data flow graph can be mapped over various calculation units, in order for the tasks to be able to be executed in a certain order. This procedure is called the planning and can be carried out statically (at the time of compilation) or dynamically (at the time of execution).

The supervision module 11 is configured to incrementally verify the consistency of the data flow system by verifying at each increment the local consistency of the current unidirectional connection connecting the first current part of the data flow graph to the second current part of the data flow graph.

Moreover, it is noted that the absence of deadlock can be verified by triggering each node the number of times specified by the repetition vector. If no deadlock is revealed during this test, the data flow graph is thus free of any locking.

Hereinafter, X denotes the repetition vector and $x_i$ denotes the $i^{th}$ component of the repetition vector X. By convention it is considered that when an actor is created, a repetition vector only including a single component, the value of which is equal to one, is associated therewith.

Moreover, the local and incremental verification of the consistency according to the invention is based on the following proposition and its corollary as well as on their implications.

Proposition: If a data flow graph G is consistent and has a valid repetition vector X, then kX is also a valid repetition vector for any natural number k (i.e. $k \in Z$).

Corollary: Let us consider a consistent data flow graph with n actors and a valid repetition vector $X=[x_1\ x_2\ \ldots\ x_n]$. Let us suppose that because of an additional design constraint, the $i^{th}$ component of the vector X must be modified. $x^*_i$ denotes the new value of the $i^{th}$ component of the vector X. Thus, in order to preserve the consistency of the data flow graph, the values of all the other components $x_j$ of the vector X (i.e. $x_j$, $j=1\ \ldots\ n$, and $j \neq n$) must be multiplied by $x^*_i/x_i$.

Figure 3:
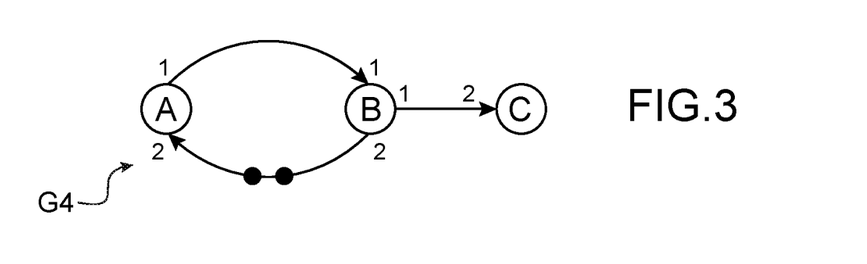
FIG. 3 is a data flow graph illustrating the verification of consistency of a connection, according to an embodiment of the present invention.

Thus, when a new unidirectional connection is created between two actors $a_i$ and $a_j$ having production and consumption rates $r_i$ and $r_j$, respectively, and being represented by components $x_i$ and $x_j$, respectively, the new unidirectional connection is considered to be consistent if two natural numbers $c_i$ and $c_j$ (i.e. $c_i \in Z$ and $c_j \in Z$), called production $c_i$ and consumption $c_j$ coefficients, satisfying a property of consistency can be found. This property is an equality between on the one hand the product of the production coefficient $c_i$ times the production rate $r_i$ times the origin component $x_i$ and on the other hand the product of the consumption coefficient $c_j$ times the consumption rate $r_j$ times the destination component $x_j$ according to the following equation:

$$c_i r_i x_i = c_j r_j x_j \quad (3)$$

Indeed, FIG. 3 is a data flow graph illustrating the verification of consistency of a connection, according to the equation (3) above.

More particularly, the example of FIG. 3 illustrates a graph G4 resulting from the modification of the consistency graph G3 of FIG. 1C by adding thereto a new actor C and a new connection between the actor B and the actor C. It is noted that this modification can be seen either as a modification of the initial graph G3 illustrated in FIG. 1C, or as a step among others in the iterative construction of the graph G4 of FIG. 3. In both cases, the modification involves adding the new connection between the actor B and the actor C. Let $X_G$ and $X_C$ be the repetition vectors of the initial graph G3 and of the actor C, respectively. In this case, the second component $x_B$ of the repetition vector $X_G$ associated with the initial graph G3 is equal to 1 (i.e. $x_B=1$) and by convention the only component $x_C$ of the repetition vector $X_C$ of the actor C is equal to 1 (i.e. $x_C=1$). On this new connection, the actor B produces a token, which means $r_B=1$, and the actor C consumes two tokens, which means $r_C=2$. It was shown above that the repetition vector $X_G$ corresponding to the initial graph G3 is $X_G=(1\ 1)$. In order to calculate the new repetition vector $X'_G$ resulting from the connection, it suffices to find two natural numbers $c_1$ and $c_2$ verifying the equation (3) above. By replacing the known variables in the equation (3), this gives $c_1=2c_2$. Moreover, a minimum repetition vector can be determined by choosing $c_1=2$ and $c_2=1$. Thus, the values corresponding to the actors B and C in the new repetition vector $X'_G$ are respectively $x^*_B=c_1 x_B=2$ and $x^*_C=c_2 x_C=1$. In this case, the property of consistency is preserved by the proportion mentioned above. Moreover, in accordance with the corollary above, the component of the repetition vector corresponding to the actor A must also be changed. Thus, after the connection of the actors B and C, the new repetition vector $X'_G$ of the graph of FIG. 3 is $X'_G=(2\ 2\ 1)$.

It is noted that it is in no way necessary to calculate a new topology matrix $\Gamma$ for the graph G4 of FIG. 3. It suffices only to find the coefficients $c_1$ and $c_2$ and then to apply the above corollary. Nevertheless, it is noted that the new repetition vector $X'_G=(2\ 2\ 1)$ found above satisfies the equation (2) with a topology matrix given by:

$$\Gamma = \begin{pmatrix} 1 & -1 & 0 \\ -2 & 2 & 0 \\ 0 & 1 & -2 \end{pmatrix} \quad (4)$$

Hereinafter, one way to choose the coefficients $c_i$ and $c_j$ in such a way as to satisfy the equation (3) for the general case in which two actors, called origin actor $a_i$ of component $x_i$ and destination actor $a_j$ of component $x_j$, are connected is shown. In particular, by choosing $c_i=x_j/r_i$ and $c_j=x_i/r_j$ and by replacing them in the equation (3), this gives:

$$\frac{x_j}{r_i} r_i x_i = \frac{x_i}{r_j} r_j x_j \quad (5)$$

This equation is of course always true. However, this choice of parameters does not guarantee whole values for the coefficients $c_i$ and $c_j$. Thus, in order for these coefficients to be whole, the equality (5) above is multiplied by the least common multiplier ppcm of the production $r_i$ and consumption $r_j$ rates and divided by the greatest common divisor pgcd of the components $x_i$ and $x_j$ of the origin and destination actors, respectively. This gives the following production $c_i$ and consumption $c_j$ coefficients:

$$c_i = \frac{m}{d}\frac{x_j}{r_i} \text{ and } c_j = \frac{m}{d}\frac{x_i}{r_j} \quad (6)$$

where $m = ppcm(r_i, r_j)$ and $d = pgcd(x_i, x_j)$

The coefficients $c_i$ and $c_j$ according to the equation (6) satisfy the condition of consistency of the equation (3).

In order to determine the minimum repetition vector, the initial components of the repetition vector are only multiplied by coefficients defined by their greatest common divisor:

$$c_i = \frac{m}{d}\frac{x_j}{r_i} \bigg/ pgcd\left(\frac{m}{d}\frac{x_j}{r_i}, \frac{m}{d}\frac{x_i}{r_j}\right) \text{ and} \quad (7)$$

$$c_j = \frac{m}{d}\frac{x_i}{r_j} \bigg/ pgcd\left(\frac{m}{d}\frac{x_j}{r_i}, \frac{m}{d}\frac{x_i}{r_j}\right)$$

The coefficients $c_i$ and $c_j$ defined in the equations (7) verify, of course, the equality (3). For example, when a new connection is established between the actors $a_i$ and $a_j$, the component $x_i$ of the repetition vector corresponding to the actor $a_i$ is multiplied by $c_i$, and the component $x_j$ corresponding to the actor $a_j$ is multiplied by the coefficient $c_j$ in order to preserve the property of consistency of the graph.

Figure 4:
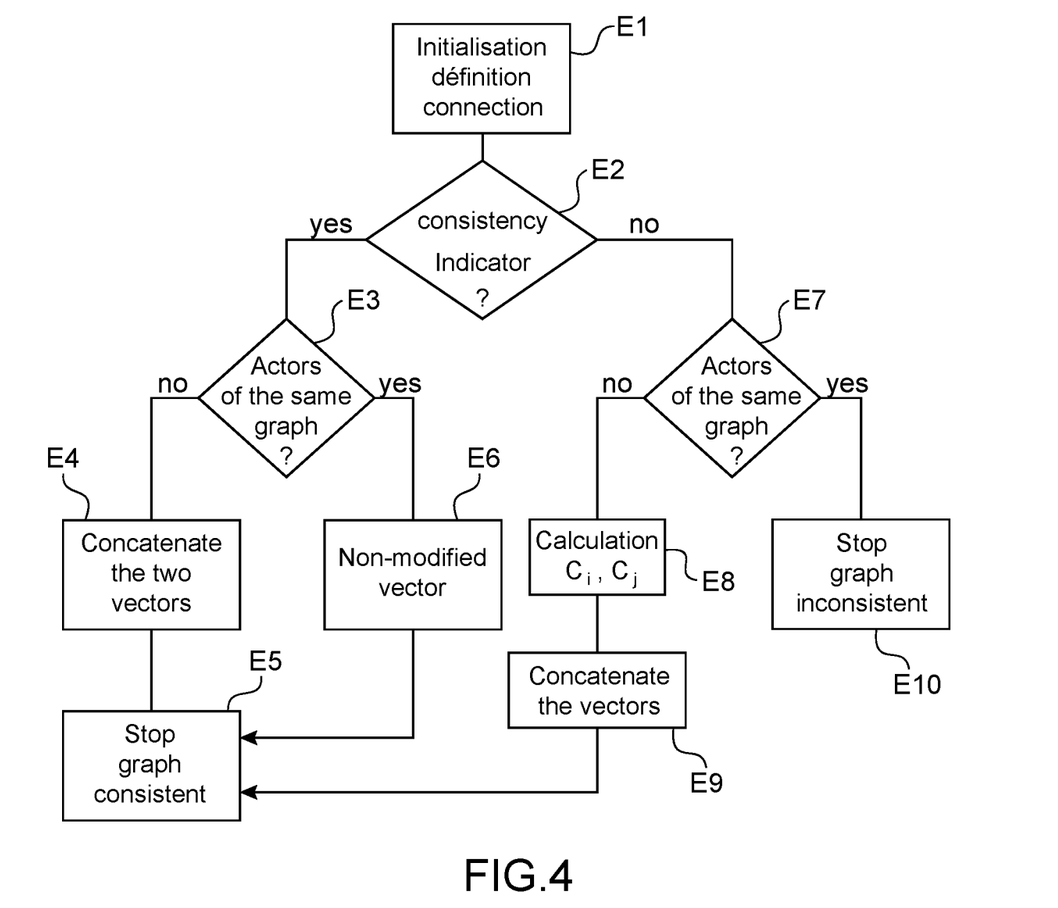
FIG. 4 is a flow chart illustrating the steps of a method for validating a data flow system, according to a preferred embodiment of the invention.

FIG. 4 is a flow chart illustrating the steps of a method for validating a data flow system, according to a preferred embodiment of the invention.

In this method, the consistency of a current unidirectional connection connecting a first current part of the data flow graph to a second current part of the data flow graph is verified.

In step E1, the current unidirectional connection connecting origin $a_i$ and destination $a_j$ actors is defined. The origin $a_i$ and destination $a_j$ actors belong to the first and second current parts of the data flow graph, respectively. The origin $x'_i$ and destination $x''_j$ components associated with the origin $a_i$ and destination $a_j$ actors are defined. It is noted that in general, the origin $x'_i$ and destination $x''_j$ components can belong to a single current repetition vector X' representative of the first and second current parts of the graph or to two distinct current repetition vectors X' and X" representative of the first and second current parts of the graph, respectively.

The definition of the current unidirectional connection includes the assigning of a production rate $r_i$ relative to the origin actor $a_i$ and of a consumption rate $r_j$ relative to the destination actor $a_j$.

It can for example be considered that a data flow graph is in construction and that a new current connection is established between the origin actor $a_i$ and the destination actor $a_j$. This case is summarised in the Algorithm described in table 1 below. In this Algorithm, two repetition vectors X' and X" respectively corresponding to the first and second current parts of the data flow graph are considered. The index of the $i^{th}$ component of the vector X' is noted as i and the index of the $j^{th}$ component of the vector X" is noted as j. The production rate corresponding to the component $x'_i$ of the vector X' is noted as $r_i$ and the consumption rate corresponding to the component $x''_j$ of the vector X" is noted as $r_j$. The operations "ppcm" and "pgcd" are noted as "lcm" and "gcd", respectively. Moreover, the resulting repetition vector corresponding to the new graph is noted as X.

```
Algorithm
1:  if r_i x'_i = r_j x"_j then
2:     c_flag ← true                       the new connection is consistent
3:  if X' and X" are two distinct vectors then
                                           connect two actors from two different graphs
4:     if c_flag is true then
5:        X ← [X' X"]
6:        STOP
7:     else
8:        m ← lcm(r_i; r_j)
9:        d ← gcd(x'_i; x"_j)
10:       ci ← (m/d)(x"_j/r_i)
11:       cj ← (m/d)(x'_i/r_j)
12:       d ← gcd(c_i; c_j)
13:       c_i ← c_i/d
14:       c_j ← c_j/d
15:       x ← [c_iX' c_jX"]
16:       STOP
17: else                                   connect two actors of the same graph
18:    if c_flag is true then
19:       X ← X'
20:       STOP
21:    else
22:       Mark this connection as not consistent
23:       Optional: Send error message
24:       STOP
```

In step E2, in order to avoid pointless operations, an indicator of local consistency of the current unidirectional connection (line 1 of the Algorithm) is first verified. This indicator of local consistency examines whether the product of the production rate $r_i$ times the origin component $x_i$ is equal to the product of the consumption rate $r_j$ times the destination component $x_j$ (i.e., $r_i \cdot x_i = r_j \cdot x_j$). Regardless of the result of this test, two cases are considered in the following steps. A first case in which the two actors come from two different repetition vectors, that is to say that there was no connection between the two actors before the new connection, and a second case in which the two actors come from the same graph, that is to say that they have the same repetition vector. According to the result of these two different cases, a resulting current repetition vector representative of the first and second current parts of the data flow graph is defined in steps E4-E6 or E8-E9.

Indeed, if the test of step E2 is positive, that is to say, in the case in which the current unidirectional connection verifies the indicator of local consistency, it is considered that the consistency flag (c_flag) is true on line 2 of the Algorithm and step E3 is carried out. Otherwise, step E7 is carried out.

Steps E3-E6 relate to the case in which the current unidirectional connection verifies the indicator of local consistency. More particularly, step E3 is a test to verify whether the origin $a_i$ and destination $a_j$ actors are associated with two distinct current repetition vectors, called origin X' and destination X" repetition vectors (i.e. the case in which there was no connection between the origin $a_i$ and destination $a_j$ actors before the current unidirectional connection). If yes, then step E4 is carried out and otherwise, step E6 is carried out.

Step E4 relates to the case in which the two actors come from two different repetition vectors and the new connection is consistent. In this case, the resulting current repetition vector X is constructed by concatenating the origin X' and destination X" repetition vectors and we stop at step E5, in which the graph is considered to be consistent. This corresponds to lines 3 to 6 of the above Algorithm.

Step E6 relates to the case in which the origin $a_i$ and destination $a_j$ actors are associated with a single current repetition vector (i.e. they come from the same graph). Thus, in this case, the resulting current repetition vector X is equal to the single current repetition vector X'. In other words, given that the two actors that it is desired to associate come from the same repetition vector and that the indicator of consistency is true, then the single current repetition vector X' is not modified and we stop at step E5 in which the graph is considered to be consistent. This corresponds to lines 18-20 of the above Algorithm.

However, if the result of step E2 is negative, that is to say, if the current unidirectional connection does not verify the indicator of local consistency, then steps E7-E9 are examined.

Step E7 is a test similar to that of step E3 in which it is verified whether the origin $a_i$ and destination $a_j$ actors are associated with two distinct current repetition vectors, called origin X' and destination X" repetition vectors. If yes, then step E8 is carried out and otherwise, step E10 is carried out.

In step E8, the two natural numbers (i.e. the production $c_i$ and consumption $c_j$ coefficients) verifying the equation (3) above are calculated. In other words, given that the new connection is not consistent, the coefficients $c_i$ and $c_j$ defined in the equation (7) are calculated in lines 8 to 14 of the above Algorithm.

In step E9, the resulting current repetition vector X (line 15 of the Algorithm) is constructed by concatenating on the one hand the origin repetition vector X' after having multiplied it by the production coefficient $c_i$ with on the other hand the destination repetition vector X" after having multiplied it by the consumption coefficient $c_j$. Then, we stop at step E5 in which it is considered that the graph is consistent.

Step E10 relates to the case in which the origin $a_i$ and destination $a_j$ actors are associated with a single current repetition vector (i.e. the actors come from the same graph), while the current unidirectional connection is identified as being inconsistent (i.e. the resulting graph is not consistent). This corresponds to lines 22-24 of the Algorithm.

Figure 5:
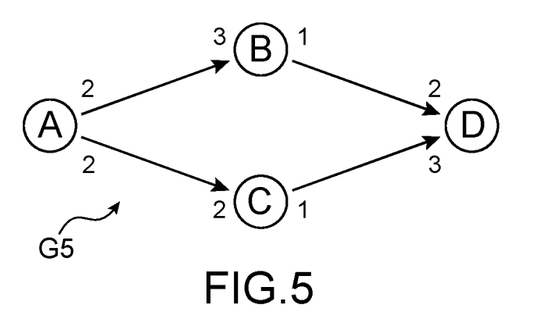
FIG. 5 schematically illustrates the construction of a data flow graph according to the method of FIG. 4.

FIG. 5 schematically illustrates the construction of a graph according to the method of FIG. 4.

More particularly, the construction of the graph G5 of FIG. 5 is an application of the Algorithm shown above. According to this example, four actors A, B, C and D are created, each of them has a repetition vector X=(1). The unidirectional connections are established in the following order: (A→B), (A→C), (B→D), and (C→D). After the connection (A→B), the calculations according to the Algorithm give the following values: $c_i$=3, $c_j$=2 and X=(3 2), since the two actors come from two different repetition vectors. Similarly, $c_i$=1, $c_j$=3 and X=(3 2 3) when the connection (A→C) is established. The connection (B→D) highlights the importance of lines 12-14 in the Algorithm. Indeed, before line 12, $c_i$=$c_j$=2. However, by using these coefficients, a minimum repetition vector is not obtained during the update of the repetition vector X like on line 15, which explains the interest of dividing the coefficients by d (lines 13 and 14). The case expressed on lines 17 and 18 of the Algorithm illustrates the connection (C→D) where the repetition vector does not change, the same applies after the connection (C→D), X=(3 2 3 1).

The example of FIG. 5 indeed shows the application of the Algorithm to a given graph G5. On the basis of this example, it is observed that lines 8-14 guarantee a set of whole-number coefficients necessary for obtaining a minimum repetition vector. Moreover, the verification of the local consistency according to the method of the present invention shows very advantageously how the number of operations required is reduced to the minimum, which is very advantageous in particular, in the case of modular applications.

Figure 6:
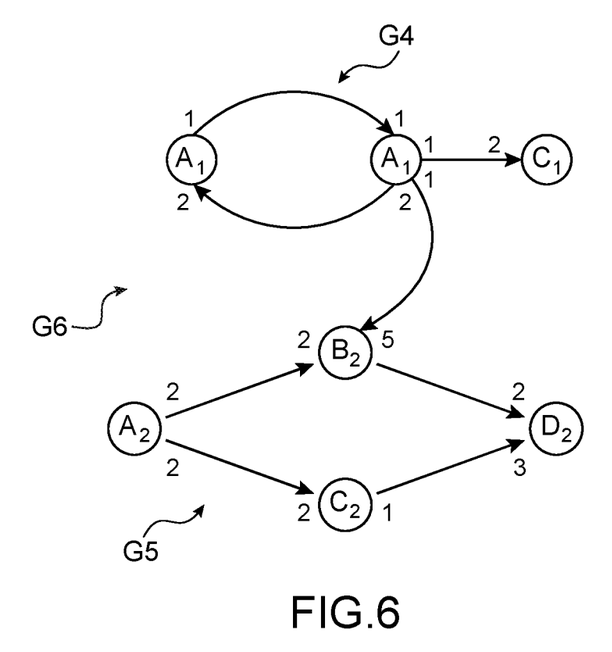
FIG. 6 schematically illustrates the connection of two distinct graphs, according to the method of the present invention.

FIG. 6 schematically illustrates the connection of two distinct graphs, according to the method of the present invention.

The example of FIG. 6 is a modular data flow application, in which the data flow graph G5 shown in FIG. 5 is added to the data flow graph G4 shown in FIG. 3 to form a new graph G6. Since the property of consistency has already been verified for the two graphs G4 and G5, only the new connection between the actor B1 of the first graph G4 and the actor B2 of the second graph G5 must be verified. By applying the above Algorithm with the inputs X'=(2 2 1), X"=(3 2 3 1), i=2, j=2, $r_i$=1, and $r_j$=5, this gives $c_i$=5 and $c_j$=1. The resulting repetition vector given by the output of the Algorithm is X=(10 10 5 3 2 3 1). It is noted that the resulting current repetition vector X of the graph G6 is constructed by concatenating the first repetition vector X' of the graph G4 after having multiplied it by the production coefficient $c_i$=5 with the second repetition vector X" of the graph G5. It is noted that the last four components are identical to those of the second repetition vector X" since the consumption coefficient $c_j$=1.

The example of FIG. 6 indeed shows that when two consistent graphs G4 and G5 are connected, the method according to the present invention allows to verify the property of consistency locally so that it is no longer necessary to reverify the consistency of the resulting graph G6. Indeed, the method according to the present invention only verifies the new connections and deduces the resulting repetition vector from the two initial repetition vectors. This is a very important advantage with respect to the conventional methods of the prior art, for which a new topology matrix must be calculated and a new matrix equation must be solved.

Moreover, the modular application described in FIG. 6 can also be seen as the construction of a first subgraph G4 in which three actors are first created and connected to each other, then the construction of a second subgraph G5 in which four other actors are created and connected to each other, and finally the two subgraphs G4 and G5 are connected to each other to form a resulting graph G6.

It is noted that the consistency is verified during the construction of each subgraph G4, G5 by assigning to each additional destination actor $a_j$ an additional repetition vector, the only component $x_i$ of which is equal to 1. The additional destination actor $a_j$ is connected by a current unidirectional connection to an origin actor $a_i$ belonging to the data flow subgraph being constructed.

Figure 7:
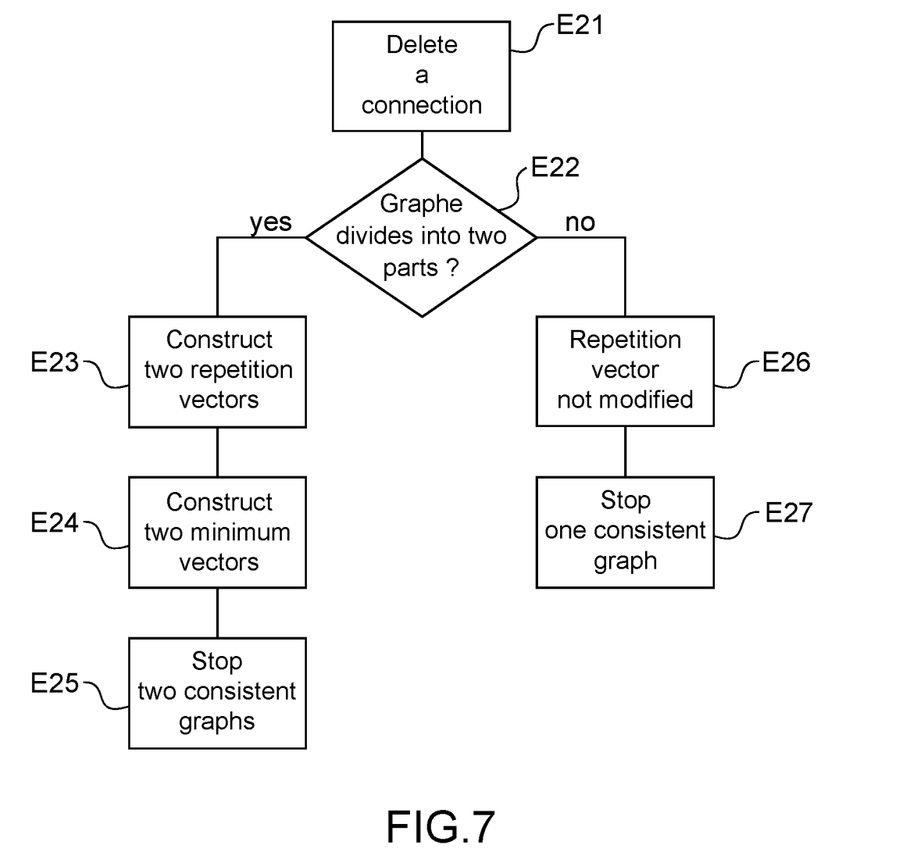
FIG. 7 is a flow chart illustrating the steps of a validation method including an operation of deletion, according to a preferred embodiment of the invention.

FIG. 7 is a flow chart illustrating the steps of a validation method including an operation of deletion, according to a preferred embodiment of the invention.

In this method, the consistency of a data flow graph is verified during the deletion of a unidirectional connection from this graph.

In step E21, a given connection is deleted from the data flow graph.

Step E22 is a test to verify whether or not the initial data flow graph divides into two distinct parts. If the data flow graph divides into two distinct parts, then step E23 is carried out and otherwise, step E26 is carried out.

Step E23 relates to the case in which the data flow graph divides into first and second data flow subgraphs after the deletion of the unidirectional connection. In this case, a first repetition vector X' is constructed by grouping together the components of the initial repetition vector relative to the first data flow subgraph, and a second repetition vector X" is constructed by grouping together the components of the initial repetition vector relative to the second data flow subgraph.

Optionally, in step E24, first and second minimum repetition vectors X* and X** are constructed by dividing the first repetition vector X' by the gcd of its components and also, by dividing the second repetition vector X" by the gcd of its components.

In step E25, two distinct and consistent data flow graphs are obtained.

Step E26 relates to the case in which the data flow graph remains connected after the deletion of the unidirectional connection. In this case, the initial repetition vector is not therefore modified.

In step E27, there is still a single consistent graph.

Figure 8:
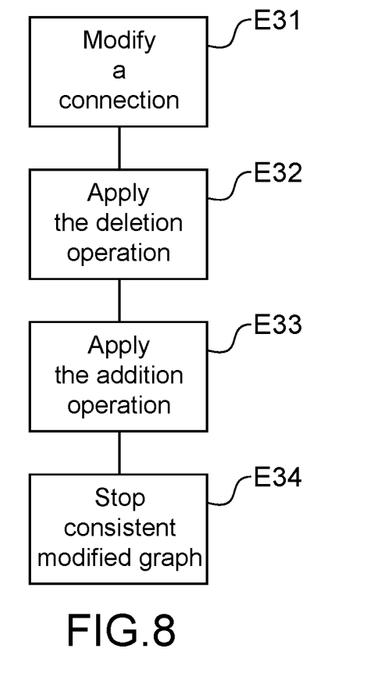
FIG. 8 is a flow chart illustrating the steps of a validation method including a modification operation, according to a preferred embodiment of the invention.

FIG. 8 is a flow chart illustrating the steps of a validation method including an operation of modification, according to a preferred embodiment of the invention.

In this method, the consistency of a data flow graph is verified during the modification of a unidirectional connection of this graph.

In step E31, a given connection of the data flow graph is modified by assigning to it new production $r'_i$ and consumption $r'_j$ rates relative to the origin $a_i$ and destination $a_j$ actors connected by this unidirectional connection.

In step E32, the operation of deletion of a unidirectional connection according to the steps of the method of FIG. 7 is applied.

In step E33, the operation of addition of a unidirectional connection described by the method of FIG. 4 according to the new production $r'_i$ and consumption $r'_j$ rates is applied.

In step E34, a modified and consistent graph is obtained.

The examples and embodiments presented above highlight the advantages of the local verification of the property of consistency. In the examples considered, it can be seen that the calculation of the topology matrix is not necessary and that the minimum repetition vector can be found in a very efficient manner and with very little calculation. Another advantage lies in the fact that the inconsistent elements can be identified and that it is not necessary to reconsider the entire graph to decide on its consistency.

Moreover, it is noted that the method according to the invention can be applied incrementally during the construction of the data flow graph. Alternatively, it can also be applied after the construction of a graph, to each of its connections.

The present invention applies to all the systems with a data flow. In particular it applies to the systems for processing a digital signal. Indeed, the processing system can be modelled by a data flow system including actors connected to each other by unidirectional communication connections. Each actor is configured to receive input data and to deliver output data.

For example, the system for processing a digital signal can be a medical imaging system, a computer vision system, a video encoding and compression system, a system for converting an audio sampling frequency, a system for designing tools for wireless communication systems, an onboard system, etc.

Thus, the system for processing a signal can be modelled by a data flow graph being constructed according to an incremental approach that can be applied during the construction of the graph. The construction of an inconsistent graph can be stopped as soon as an inconsistent element has been identified.

Moreover, the modelling of the system for processing a signal can be carried out modularly. Let us suppose that it is desired to model an onboard anticollision system in a vehicle and that it is desired to add a radar module to a camera vision module. Let us suppose that each of the radar and vision modules is described by a consistent graph. The consistency of the combination of the two modules can be determined according to the present invention by verifying only the modifications generated by the combination, such as the addition of the connections between the two graphs, and can thus reduce the number of operations required to verify the consistency.

Figure 9A:
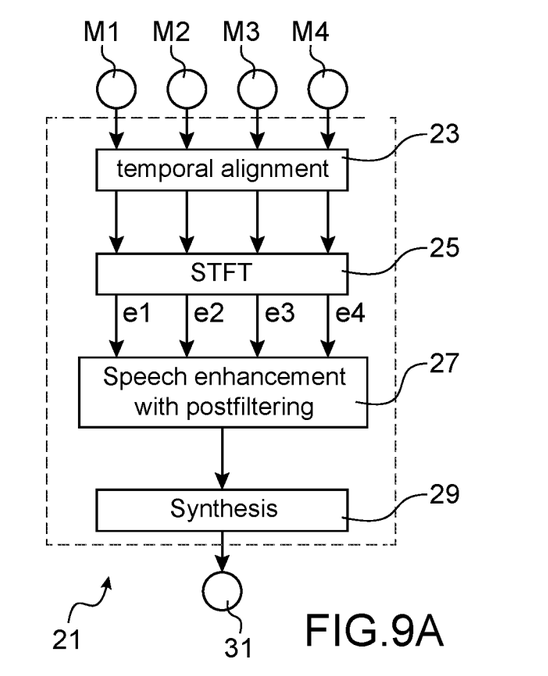
FIG. 9A and FIG. 9B illustrate as an example the verification of consistency in a data flow system modelling a multichannel speech enhancement device, according to the present invention.
Figure 9B:
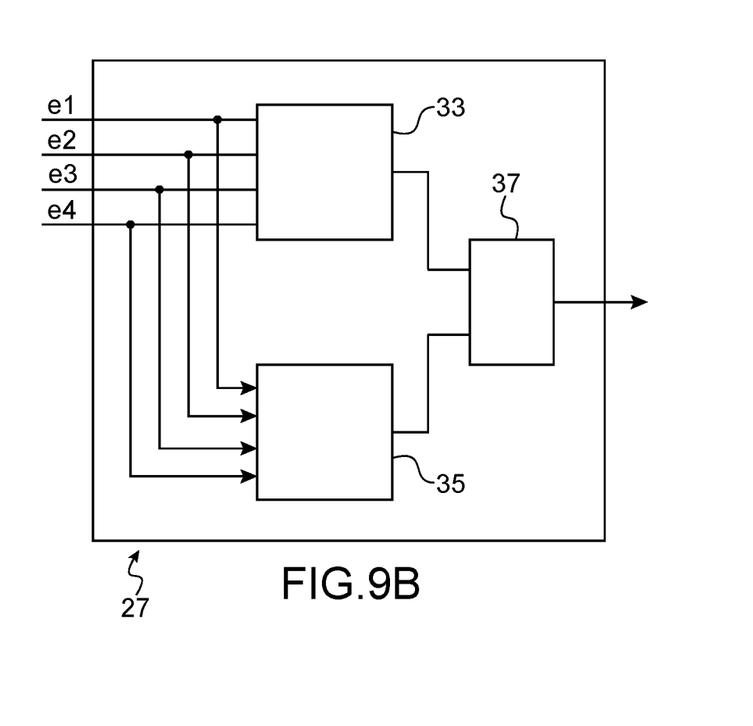

FIG. 9 illustrates as an example the verification of consistency in a data flow system modelling a multichannel speech enhancement device, according to the present invention.

The multichannel speech enhancement device 21 is connected to a network of four microphones M1-M4. The noisy signals coming from these four microphones M1-M4 are processed by a set of signal-processing units 23, 25, 27 and 29 comprised in the device 21 to extract the signal of the enhanced speech at the output 31. Indeed, the speech enhancement device 21 includes a unit for temporal alignment or synchronisation 23, a short-time Fourier transform (STFT) unit, a unit for improving the signal with postfiltering 27 and a unit for addition or synthesis 29.

In particular, the unit for speech enhancement with postfiltering 27 includes a first MVDR (Minimum Variance Distortionless Response) spatial filtering module 33, a second module 35 for estimating postfiltering and a third postfiltering module 37. The signals e1-e4 coming from the Fourier transform unit 25 are injected on the one hand into the first spatial filtering module 33 (Beamformer) and on the other hand into the second module 35 for estimating postfiltering. Moreover, the output signals of the first 33 and second 35 modules are injected into the third postfiltering module 37 and the output signal of the latter is injected into the synthesis unit 29. It is noted that each of the modules 33, 35 and 37 can include a set of actors. Thus, the postfiltering module 37 can be modelled by a data flow graph in which the property of consistency is verified for all the actors according to the method of the present invention.

Moreover, once the property of consistency has been verified for all the modules 33, 35, 37 of this application, some of them can be modified. Let us suppose for example that the multichannel speech enhancement application uses a McCowan postfilter for the postfiltering module 37. This filter can be replaced by a Wiener postfilter in order to obtain a more precise estimation of the spectral density of the noise. In this case, it is not necessary to once again verify the property of consistency for all of the modules. Indeed, if the new postfiltering module verifies the property of consistency, this does not affect the property of consistency of the other modules and it is concluded therefrom that the entire application verifies the property of consistency according to the method of the present invention.

REFERENCES

1. Lee, E. A., Messerschmitt, D. G.: Synchronous data flow. Proceedings of the IEEE 75(9), 1235{1245 (1987).
2. Lee, E. A., Messerschmitt, D. G.: Static scheduling of synchronous data flow programs for digital signal processing; IEEE Transactions on computers 100(1), 24{35 (1987).

The invention claimed is:

1. A method, implemented by a microprocessor of a processing system, for processing a digital signal, said processing system is modelled by a data flow system including actors connected to each other by unidirectional communication connections, each actor being configured to receive input data and to deliver output data, the method comprising:
   validating the data flow system represented by a data flow graph including the actors having determined production rates and consumption rates, by performing an incremental verification in which the consistency of a current unidirectional connection connecting a first current part of the data flow graph to a second current part of the data flow graph is locally verified at each increment without reconsidering the entire data flow graph.

2. The validation method according to claim 1, characterised in that it includes the following steps:
   defining origin and destination actors connected by said current unidirectional connection, the origin and destination actors belonging to said first and second current parts of the data flow graph, respectively, the origin and destination actors being defined by origin $x_i$ and destination $x_j$ components, respectively, that can belong to a single current repetition vector or to two current repetition vectors representative of said first and second current parts of the data flow graph,
   assigning to said current unidirectional connection a production rate $r_i$ relative to the origin actor and a consumption rate $r_j$ relative to the destination actor,
   verifying an indicator of local consistency of said current unidirectional connection, said indicator of local consistency examining whether the product of said production rate $r_i$ times said origin component $x_i$ is equal to the product of said consumption rate $r_j$ times said destination component $x_j$,
   defining a resulting current repetition vector representative of said first and second current parts of the data flow graph.

3. The validation method according to claim 2, characterised in that in the case in which said current unidirectional connection verifies the indicator of local consistency, said method includes the following steps:
   if the origin and destination actors are associated with two distinct current repetition vectors, called origin and destination repetition vectors, then the resulting current repetition vector is constructed by concatenating said origin and destination repetition vectors, and
   if the origin and destination actors are associated with a single current repetition vector, then the resulting current repetition vector is equal to said single current repetition vector.

4. The validation method according to claim 2, characterised in that in the case in which said current unidirectional connection does not verify the indicator of local consistency, said method includes the following steps:
   if the origin and destination actors are associated with two distinct current repetition vectors, called origin and destination repetition vectors, then two natural numbers are calculated, called production coefficient $c_i$ and consumption coefficient $c_j$ verifying an equality between on the one hand the product of said production coefficient $c_i$ times said production rate $r_i$ times said origin component $x_i$ and on the other hand the product of said consumption coefficient $c_j$ times said consumption rate $r_j$ times said destination component $x_j$, and the resulting current repetition vector is constructed by concatenating the origin repetition vector after having multiplied it by the production coefficient $c_i$ with the destination repetition vector after having multiplied it by the consumption coefficient $c_j$, and
   if the origin and destination actors are associated with a single current repetition vector, then the current unidirectional connection is identified as being inconsistent.

5. The validation method according to claim 4, characterised in that the production $c_i$ and consumption $c_j$ coefficients are given by the following equations:

$$c_i = \frac{m}{d}\frac{x_j}{r_i} \Big/ pgcd\left(\frac{m}{d}\frac{x_j}{r_i}, \frac{m}{d}\frac{x_i}{r_j}\right) \text{ and}$$

$$c_j = \frac{m}{d}\frac{x_i}{r_j} \Big/ pgcd\left(\frac{m}{d}\frac{x_j}{r_i}, \frac{m}{d}\frac{x_i}{r_j}\right)$$

where m=ppcm($r_i$,$r_j$) and d=pgcd($x_i$,$x_j$).

6. The validation method according to claim 5, characterised in that it includes an operation of addition of a new unidirectional connection between first and second current parts of the data flow graph.

7. The validation method according to claim 5, characterised in that it includes an operation of deletion of a unidirectional connection from the data flow graph represented by a single repetition vector, called initial repetition vector, according to the following steps:
   if the data flow graph is divided into first and second data flow subgraphs after the deletion of said unidirectional connection, then a first repetition vector is constructed by grouping together the components of said initial repetition vector relative to said first data flow subgraph, and a second repetition vector is constructed by grouping together the components of the initial repetition vector relative to said second data flow subgraph, and if the graph remains connected after the deletion of said unidirectional connection, then said initial repetition vector is not modified.

8. The validation method according to claim 7, characterised in that it includes an operation of modification of a unidirectional connection, according to the following steps:

assigning new production $r'_i$ and consumption $r'_j$ rates relative to the origin and destination actors connected by said unidirectional connection, applying the operation of deletion of a unidirectional connection, and applying an operation of addition of a new unidirectional connection between first and second current parts of the data flow graph.

9. The validation method according to claim 2, characterised in that it includes the verification of the consistency of the data flow graph during its construction or its modification, by assigning to each additional destination actor an additional repetition vector, the only component $x_i$ of which is equal to 1, said additional destination actor being connected by said current unidirectional connection to an origin actor belonging to said current data flow graph being constructed or modified.

10. A system for processing a digital signal designed said processing system is modelled by a data flow system including actors connected to each other by unidirectional communication connections, each actor being configured to receive input data and to deliver output data, the processing system comprising:

a microprocessor configured to validate the data flow system represented by a data flow graph including the actors having determined production rates and consumption rates, by performing an incremental verification in which the consistency of a current unidirectional connection connecting a first current part of the data flow graph to a second current part of the data flow graph is locally verified at each increment without reconsidering the entire data flow graph.

11. The system for processing a digital signal according to claim 10, characterised in that said processing system is a system out of any one of the following processing systems: medical imaging system, computer vision system, video encoding and compression system, system for converting an audio sampling frequency, system for designing tools for wireless communication systems, multichannel speech enhancement system, onboard system.

* * * * *